H. E. DUNHAM.
INTERNAL COMBUSTION ENGINE AND METHOD OF OPERATING THE SAME.
APPLICATION FILED DEC. 17, 1913.

1,106,194.

Patented Aug. 4, 1914.

H. E. DUNHAM.
INTERNAL COMBUSTION ENGINE AND METHOD OF OPERATING THE SAME.
APPLICATION FILED DEC. 17, 1913.

1,106,194.

Patented Aug. 4, 1914.
5 SHEETS—SHEET 5.

UNITED STATES PATENT OFFICE.

HERMON L. DUNHAM, OF SEATTLE, WASHINGTON, ASSIGNOR TO THE HERMON L. DUNHAM MOTOR COMPANY, OF SEATTLE, WASHINGTON, A CORPORATION OF WASHINGTON.

INTERNAL-COMBUSTION ENGINE AND METHOD OF OPERATING THE SAME.

Specification of Letters Patent.  Patented Aug. 4, 1914.

Original application Serial No. 566,362, filed June 8, 1910. This application filed December 17, 1913. Serial No. 807,239.

*To all whom it may concern:*

Be it known that I, HERMON L. DUNHAM, a citizen of the United States, residing at Seattle, in the county of King and State of Washington, have invented certain new and useful Improvements in Internal-Combustion Engines and Methods of Operating the Same; and I do hereby declare the following to be a full, clear, and exact description of the invention, such as will enable others skilled in the art to which it appertains to make and use the same.

This invention relates to internal combustion engines of the type disclosed in my co-pending application Serial No. 844,562 filed June 11, 1914, and it has special reference to engines of the four-cycle type, although certain phases of my improvements are likewise applicable to two-cycle engines as well.

The primary object of the invention is to provide for the practically thorough and complete combustion of the fuel used, so that fuels of the lowest grade and of various kinds can be employed with the entire elimination of the carbonizing and sooting of the engine parts. This result is attained by introducing into the engine or motor during the operation thereof a quantity of air which is considerably in excess of that required to support the combustion of fuel and which is sufficient to cause a practically thorough oxidation and consumption of the fuel charges. It follows, therefore, that the fuel charges or the fuel are entirely carbonous properties of the fuel are entirely burned without deposition of carbon or other deposit on the spark plug and the walls of the piston and cylinder. I also propose to use fresh air from the same source as that acting to support the fuel combustion as a medium to scavenge the engine cylinder during the exhaust period in order that practically all of the dead gases may be driven out of the exhaust port or ports. As an additional charge of fuel is introduced into the cylinder, so that this subsequent charge may find the cylinder practically full of fresh air. The combustion supporting air and the scavenging air, although derived from the same source as stated, are introduced at different intervals, of course, and with part of the scavenging air still remaining in the cylinder when the charge is fed in, the addition of a quantity of combustion supporting air will naturally raise the amount of oxygen in the cylinder to an excess necessary to produce the complete combustion of fuel which is contemplated.

The excess air referred to above is likewise of value in producing a relatively high compression, with a consequent increase in power, and the compression is also made practically constant or uniform at the ignition point, without regard to the quantity of fuel fed in from the inspirator, which, of course, is much to be desired. The high compression and the excess amount of oxygen prevent the fouling of the engine parts by partially burned fuel, and the practically constant compression makes the ignition more reliable and punctual than has heretofore been possible.

The invention likewise contemplates improvements in certain features of the engine, and particularly in the provision of improved fuel supply mechanism, designed to increase the power and efficiency of the engine, and acting either in conjunction with the carbureter, which latter supplies a primary charge to furnish the initial heat when ignited, or operating by itself under certain conditions, to be hereinafter explained. This makes it possible to run the engine on two kinds of fuel at the same time, by introducing it into the cylinder at different points at the same time, or else with fuel admitted at either of these points. The additional fuel supply means, preferably takes the form of an inspirator by means of which fuel of any appropriate character (though I contemplate especially the use of low grade liquid oils in this connection) is fed into the cylinder at the suction stroke mixed with a supply of air under pressure; and this fuel, of which a number of kinds may be used in connection with the same inspirator, may be introduced into the cylinder together with a quantity of water which is so controlled as to enter the cylinder only when it will generate steam therein to assist the power stroke and be of advantage in cooling the cylinder walls.

In the accompanying drawings.

Although certain features of the invention are applicable to two cycle engines, a four-cycle engine has been illustrated in the drawings and the invention will be described in connection therewith, as this is the preferred embodiment.

Referring to the drawings, the construction illustrated in Figs. 1 to 4 inclusive comprises a plurality of cylinders A, each having a piston B. In this form an auxiliary piston C (Fig. 4) is provided to slide in and coöperate with an extension or elongation D of the cylinder A, to serve as an air compressor, which will hereinafter be more fully described. The pistons B and C may be connected in any desired manner to effect their movement in unison, but preferably a sleeve c serves this purpose. The crank case E contains the usual crank shaft (not shown) connected to the connecting rod F, which is preferably pivoted to the sleeve c at a point f. Each cylinder A is provided with the ordinary water jacket G, and at the upper end or head portion each cylinder is in communication with a fuel admission or firing chamber H into which the usual spark plug I projects. Fuel is supplied to this chamber from the carbureter in the usual way by means of an opening J controlled by a spring pressed valve j at the junction of said pipe with the firing chamber. The valve j is of the customary type and it is normally held closed by its spring, though the creation of a partial vacuum in the cylinder A will cause the valve to be sucked downward away from its seat in order to admit the carburetted air from the inlet J. The cylinder A is likewise provided, preferably at the point indicated, with an exhaust valve L of the poppet type operated in any suitable manner, such as by the cam l. This valve coacts with a seat formed in a passage M which communicates with a second exhaust passage m in the cylinder wall, intermediate of the length of the cylinder, which port is controlled by the piston B, as will hereinafter appear. The exhaust valve L is normally held seated by a spring l', but it is raised mechanically at the proper time to effect the exhaust by means of the cam l.

As previously intimated, a very essential part of the invention consists in the introduction of a considerable quantity of air into the cylinder at such a time as to support and complete the combustion and again when it is advantageous to scavenge the cylinder and drive out the burned gases. This air must be under compression if good results are to be obtained, so that such compression acting against the partial vacuum or at any rate the lower pressure which is present in the cylinder, will result in a remarkably quick and comparatively great influx of fresh air into the latter at the proper time. I prefer to compress the air either in the extension D of the cylinder or in the crank case or base of the engine itself, and I shall describe the invention as carried out in that way, but it should be understood that if desired the compression may take place elsewhere.

In the form shown in Figs. 1 to 4, atmospheric air is admitted to the compressor portion D of the cylinder through a suitable check valve n or the equivalent means preferably associated with the conduits N and O. The conduit N connects the compressor portion D of the first cylinder with the upper portion A of the adjacent cylinder, as will be clear from an inspection of Fig. 1. Likewise a second conduit O connects the lower portion D of the second cylinder with the upper portion A of the first cylinder. In the third and fourth cylinders, the upper and lower portions of the cylinders are connected in a similar manner, so that as the piston B moves upwardly, the compressor piston C forces air through the conduit associated with its cylinder into the upper portion of the adjacent cylinder. Ports o are provided in the cylinder wall to admit the compressed air from the conduits N and O, said ports being controlled by the movement of the piston. These parts complete the requisite of my improved engine, in so far as complete combustion and scavenging are concerned, but inasmuch as I prefer to employ an additional or auxiliary fuel supply mechanism, as previously described, for the purpose of increasing the efficiency of the engine, and enabling it to be run very economically on low grade fuels of various compositions I shall now proceed to describe a preferred form of such fuel supply mechanism and I shall then take up the operation of the engine as a whole. It should be stated, however, that under some conditions the auxiliary fuel supply may be altogether omitted, and it will be sufficiently apparent how the engine would operate under these circumstances.

Figure 6:
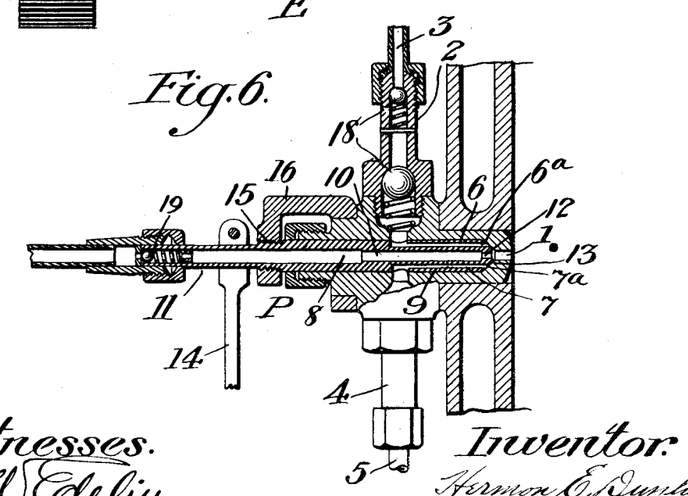
Fig. 6 is a sectional view of the inspirator employed.

The inspirator or injector mentioned above, by which the additional supply of fuel is effected, is preferably supplied with compressed air either from the lower portion D of the cylinder or from the crank case, as will hereinafter more fully appear, and this air is fed into the inspirator without obstruction or obturation, though the passage of the fuel or fuels and of water or other liquid to the cylinder by means of the inspirator is suitably controlled in the inspirator itself. Referring particularly to Fig. 6, it will be seen that I employ an inspirator P comprising a casting or casing adapted to be inserted into the cylinder wall. In the embodiment illustrated the inspirator is shown as adapted to introduce one kind of fuel and also a liquid, such as water, but it will be evident that various kinds of fluids in different combinations and in different numbers may be employed without modifying the construction of the inspirator very materially.

At the interior end of the inspirator P, which is in direct communication with the cylinder A, said inspirator is provided with a restricted discharge opening or nozzle 1, and said opening or nozzle leads directly into a longitudinal bore in the inspirator casing. This bore communicates with a number of branch connections through which the fluids to be used (exclusive of the compressed air) are admitted, and in the device shown in the drawings the branch 2 is intended to receive fuel such, for example, as crude oil, from a fuel pipe 3, while the branch 4 receives water from a water supply pipe 5. The branches 2, 4 are in communication with longitudinal side passages 6, 7, respectively formed in a tube or casing 8 movable lengthwise in the bore 9 of the inspirator casing and having an air passage 10 in communication with the compressor C—D of the adjacent cylinder by means of a pipe or conduit 11. The passage 10 is arranged centrally of the casing 8 and at one end it terminates in a restricted opening 12 which is in alinement with the discharge opening 1 of the inspirator casing. The passages 6, 7 leading to the fuel supply and the water supply respectively are located at opposite sides of the air passage 12 and their outlet ends 6ª, 7ª are formed in a frusto-conical end wall of the casing 8 coacting with a correspondingly inclined surface 13 in the main casing bore 9 in such a way that although the air passage 12 is always in unobstructed communication with the discharge opening 1, the fuel and water passages 6, 7 may be closed by the engagement of the inclined end of the casing 8 with said surface 13, as indicated in Fig. 6.

Figure 1:
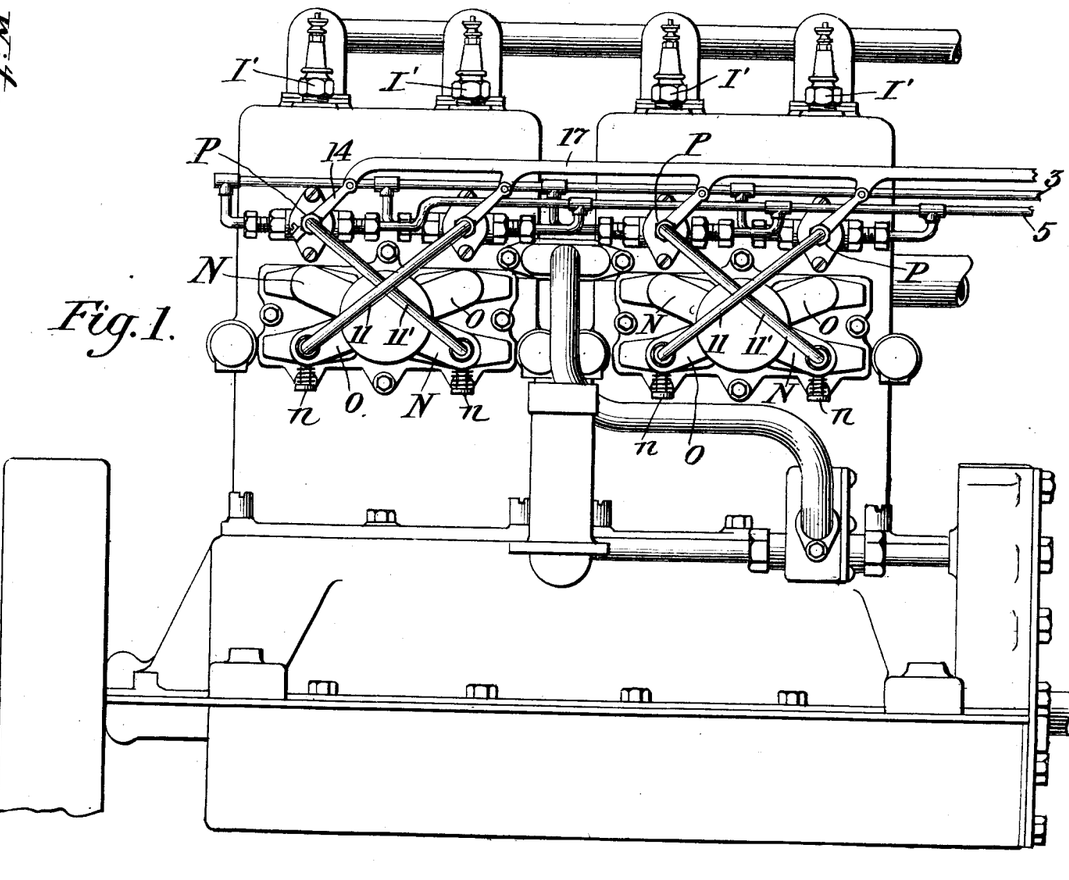
—Figure 1 is a side elevation of a four-cylinder engine constructed in accordance with the invention.
Figure 2:
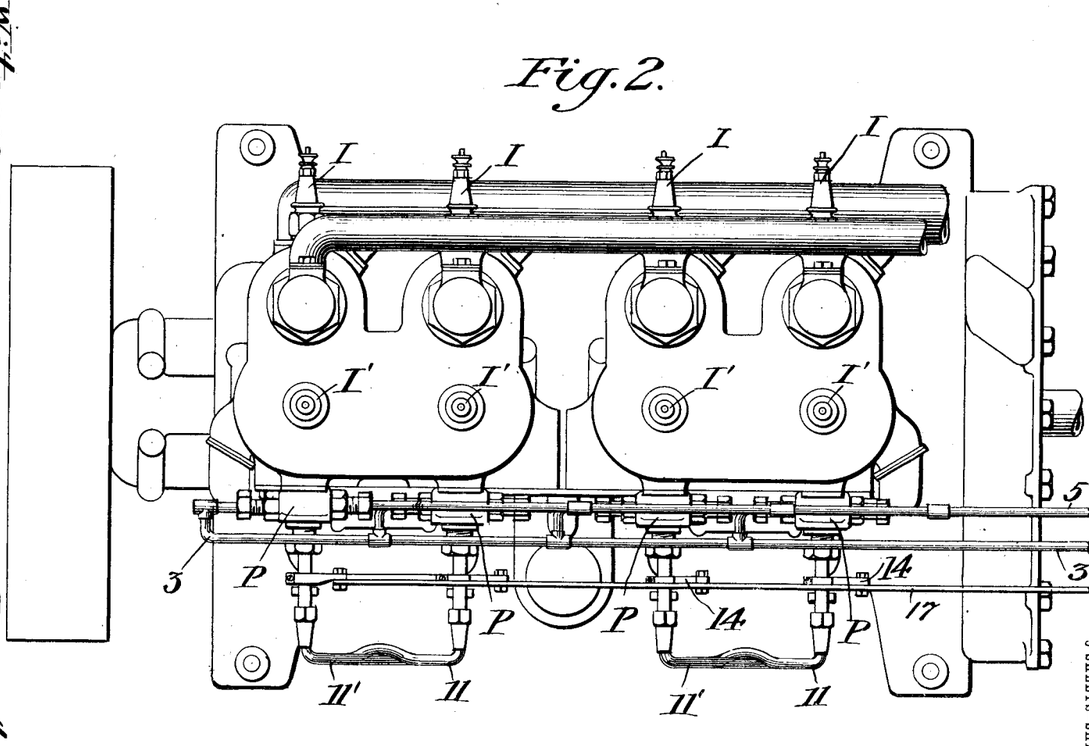
Fig. 2 is a top plan view of the same.
Figure 3:
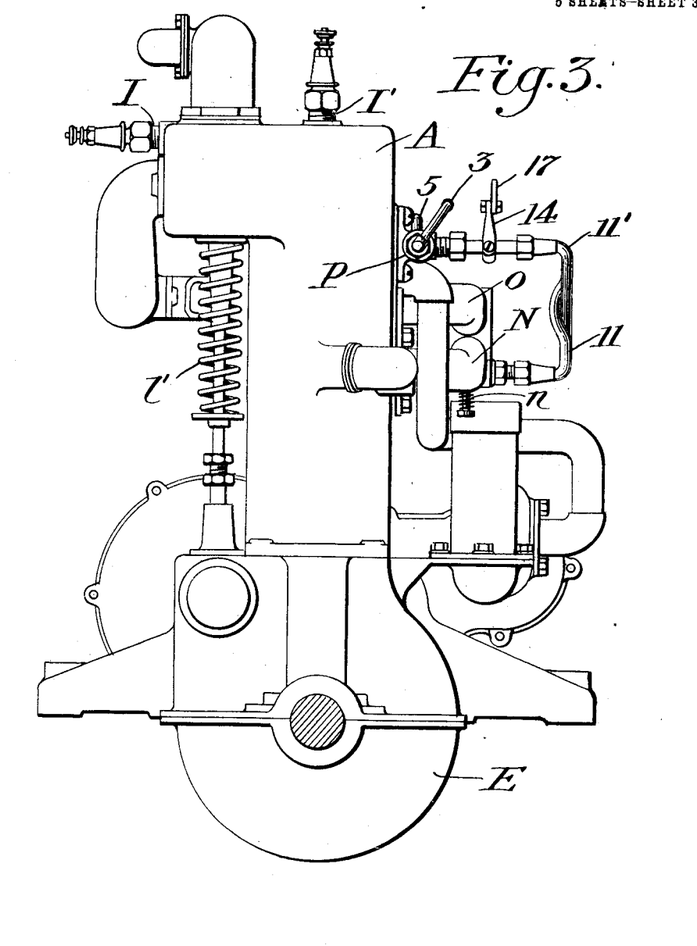
Fig. 3 is a side elevation of the engine shown in Figs. 1 and 2.
Figure 4:
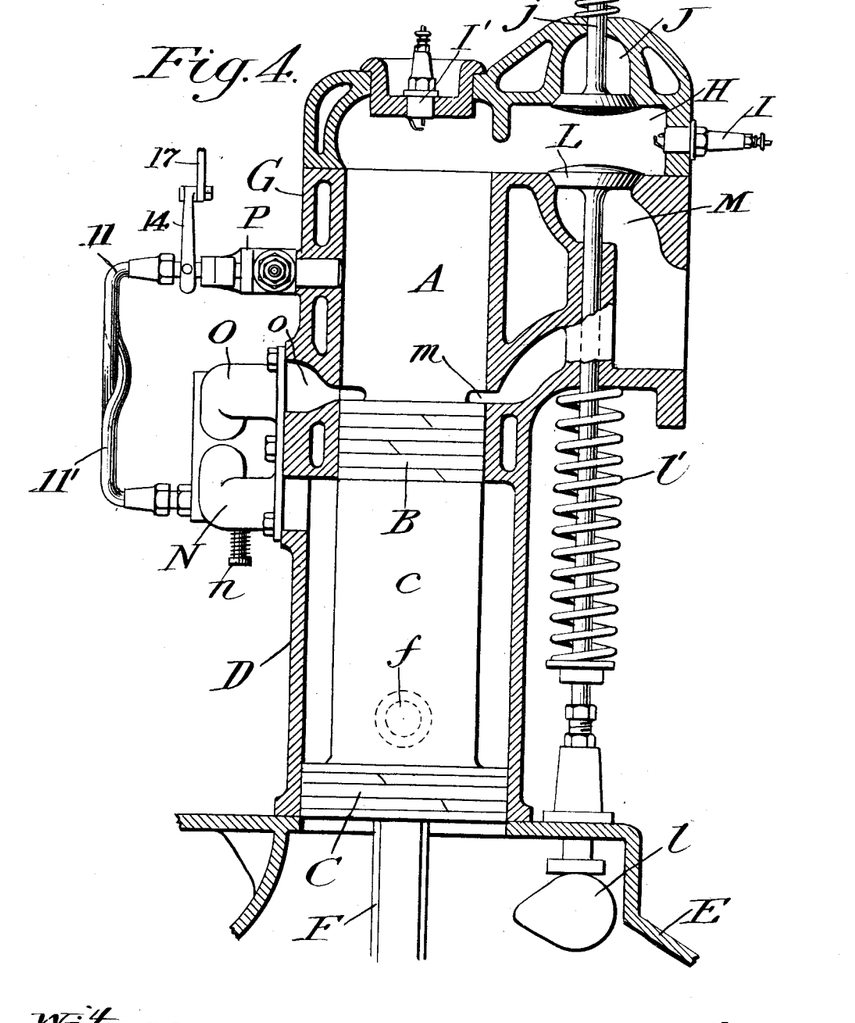
Fig. 4 is a sectional view of one of the cylinders of the engine illustrated in Figs. 1, 2 and 3, certain parts being omitted for the sake of clearness.

The casing 8 may be actuated in any suitable manner to control the supply of fuel and water, but preferably each inspirator has associated therewith a lever 14 which, when oscillated, turns the casing 8, and due to the threaded portion 15 thereof coöperating with a threaded portion on the bracket 16, the casing 8 is made to move inwardly or outwardly depending upon which way the lever 14 is shifted. The levers 14 are preferably all interconnected with a single operating rod 17, as best shown in Fig. 1.

Check valves 18 are used in both the fuel and water branches 2 and 4, respectively, and a check valve 19 is associated with the air inlet 11. These valves permit the fuel water and air to be drawn into the cylinder on the suction stroke, but prevent any back flow from the cylinder through the inspirator when the pressure in the cylinder increases.

The operation then is as follows:—On the suction stroke, viz., the down stroke of the piston, the carburetted air is supplied to the cylinder by way of the firing chamber H into which the charge is admitted by the lifting of the valve j under the influence of the partial vacuum created in the cylinder. At the same time, fresh air is admitted to the cylinder D by means of the check valve n and is later compressed by the piston C on its upward stroke, as will be understood. Of course when the piston begins its suction stroke, it is well toward the top or head of the cylinder, leaving only the customary clearance space which, however, is in direct communication with the firing chamber. The compressed air inlet port o, together with the discharge opening l of the inspirator and the exhaust port m, are of course, closed directly by the piston itself at the time that it begins its suction stroke, but it will be obvious that on a continuance of such stroke, the mixture of fuel and water will be atomized into the cylinder by the action of the vacuum and the incoming compressed air traveling from the lower portion D of the adjacent cylinder to the inspirator through pipe 11. It will be noted that as the pistons B and C of one cylinder are moving down the pistons of the adjacent cylinder are moving up. Hence on the suction stroke of piston B in Fig. 4, the inspirator is supplied with compressed air from the adjacent compressor C—D, since said adjacent compressor is in the act of compressing the air while that associated with the same cylinder in which the suction stroke occurs is merely drawing in its charge of air through valve n. The conduit 11 therefore supplying air to the inspirator P in Fig. 4 crosses the conduit 11' and derives its air supply from the adjacent compressor, as best shown in Fig. 1. As the air from the compressor is under pressure, and as a partial vacuum exists in the cylinder on the suction stroke, the uncovering of the discharge opening l of the inspirator will cause the air in the pipe 11 to be sucked into the cylinder at high speed, mixed with the other incoming fluids, whereby the cylinder is rapidly and completely filled with a combustible mixture derived from two sources (the carbureter intake and the inspirator) combined, however, with a large quantity of air. On the further movement of the piston at the same stroke the air inlet port o will be uncovered, and as this port is of considerably greater area than the discharge of the inspirator, the greater part of the compressed air remaining in the compressor which supplies the inspirator will be delivered immediately into the cylinder, and the latter will be rapidly filled with a comparatively large body of fresh air to support and complete the combustion after the ignition of the charge. Owing to the fact that a vacuum still exists in the cylinder to a certain extent when the port $o$ is uncovered by the piston, the great difference in pressure between the cylinder and the compressor will cause the compressed air to enter the cylinder with remarkable rapidity, and this air is sufficient in quantity to effect practically a complete combustion of the entire fuel content of the cylinder even when fuels of very low grade are used and regardless of the condition of mixture and proportions of the carburetted mixture. The fuel may be too rich, of course, to ignite if it is not properly controlled, but if there is any ignition at all the body of air present is sufficient to produce a practically perfect and complete combustion, with the attendant elimination of smoke, smell and fouling of the engine parts.

It will be understood that the inspirator and the compressed air inlet $o$ remain uncovered during the initial part of the compression stroke, to enable a full charge of fuel and air to be introduced, but on the continuance of the compression stroke, at which time, of course, the inlet valve $j$ has been closed, the port $o$ will be closed and shortly after the inspirator discharge $l$ will be closed. In the meantime a fresh body of air will be sucked into the cylinder D through the check valve $n$. It is evident that the supply of fuel and water introduced through the inspirator may be regulated by the mechanism previously described, but air will pass into the cylinder from the inspirator as long as the pressure in the cylinder is less than that in the compressor. As the piston continues its upward movement after closing the aforesaid ports and discontinuing the air and fuel supply, the body of air, fuel and water is highly compressed and this compression continues until the piston arrives at or near its upper dead point, at which time the explosive or combustible mixture is ignited by the spark plug I and an auxiliary plug I' which may be provided, if desired. The complete combustion of the fuel is then obtained by the comparatively great amount of oxygen present, as previously explained, and the piston passes through the working stroke or cycle under the influence of the expansion of the gases and of the steam generated by the introduction of the water into the cylinder into gases, whereby a working stroke of maximum power is obtained. Not only is the working stroke of the piston effected by the ignition and expansion of the fuel, which is completely burned by the excess of air present, but the air itself is a very important factor in the actual production of pressure on the piston. It will be remembered that the air taken from the compressor is under compression and considerably above atmospheric pressure when it enters the cylinder, and on the upward or compression stroke of the piston such compression of the air will be further increased throughout the length of said stroke. This comparatively high and practically uniform compression, which is so important in producing a reliable ignition, as above explained, is also effective in raising the heat of the already warm air to a considerable degree, and further heat is absorbed from the cylinder walls and piston, so that on the working stroke, when the air is still further heated by the ignition of the charge in the firing chamber and in the clearance space, expansion of the air will take place, in proportion to the heat absorbed, with a correspondingly powerful stroke of the piston as a result. For this reason, it is possible to run the engine with a comparatively small supply of fuel when the load is light, whereby the engine is converted into what is substantially a hot air engine. At or near the end of the working stroke the exhaust valve L is opened by its cam, so that the escape of the products of combustion through the exhaust passage M and port $m$ is begun, and at the same time the compressed air inlet $o$ is opened to admit air from the compressor, which in this case is scavenging air. When the scavenging air passes into the cylinder it passes across the same and drives the exhaust gases directly through the port $m$ and passage M into the exhaust pipe. The port $m$ is closed however, early in the exhaust stroke of the piston, and the further scavenging of the cylinder is produced by the piston itself in carrying upward the body of introduced air and thereby forcing out the remaining products of combustion through passage M, and exhaust valve. Obviously, the amount of air introduced into the cylinder for scavenging purposes must be such that while it will completely clear the cylinder of burned gases, first by way of port $m$ and then by way of passage M, very little of such air is driven out into the exhaust pipe, for it is highly advisable to use all of this air as a combustion supporting medium into which the next charge of fuel from the carbureter is sucked.

By injecting water through the inspirator for the power stroke and controlling such water by the means described, it is possible to obtain a very effective cooling of the cylinder walls in addition to the increased power of the working stroke, and such cooling makes it possible to omit the water jacket of the engine in some cases.

When an engine constructed in accordance with my invention embodies four or more cylinders, it is an easy matter to "start on the spark," for the reason that each time the operation is discontinued the cylinders are left full of fresh air instead of dead gases and the introduction of air under pressure for the special purposes of starting the engine is rendered unnecessary.

Figure 5:
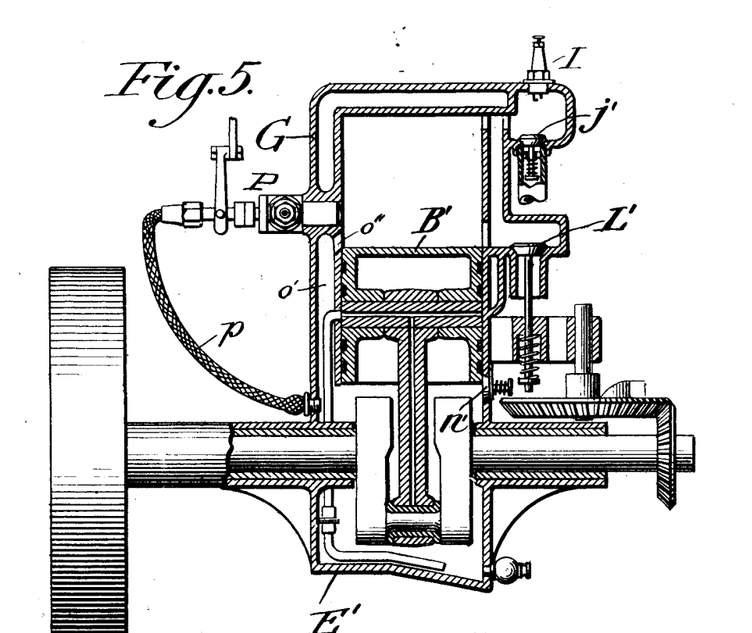
Fig. 5 is a sectional view of a single cylinder engine constructed in accordance with the invention.

In Fig. 5 a single cylinder engine is shown in which the air is compressed in the crank case. For this purpose, a check valve $n'$ is provided in the crank case, E', so that when the piston B' makes its upward stroke, it draws in a charge of air into the crank case. On the down stroke of the piston it serves to compress the charge and supplies the inspirator P through a connection $p$ in the same manner as hereinbefore described in connection with the four-cylinder engine. In the single cylinder engine the air is preferably admitted from the crank case to the cylinder through a port $o'$ in the cylinder wall communicating with the passage $o''$ in the cylinder wall. In this form the admission and exhaust valves $j'$ and $L'$ respectively have been placed in slightly different positions, but the general operation of the form disclosed in Fig. 5 is identical with that of the four-cylinder engine hereinbefore described in detail.

What I do claim as my invention, and desire to secure by Letters Patent, is:—

1. In an internal combustion engine, the combination with the cylinder and the piston, and means to supply fuel to the cylinder on the suction stroke, of means to supply air to the cylinder at the ends of the suction and working strokes, for combustion-supporting and scavenging purposes respectively, and an additional fuel supply means operated to supply fuel to the cylinder near the end of the suction stroke, which fuel is consumed in the excess of air in the cylinder.

2. In an internal combustion engine, the combination with the cylinder and piston, and means for supplying carbureted air to the cylinder on the suction stroke, of means for supplying air to the cylinder on alternate outward strokes, and an additional fuel supply means for spraying fuel into the cylinder near the end of the suction stroke, such additional fuel being thereby mixed with the excess of air in the cylinder.

3. In an internal combustion engine, the combination with the cylinder and the piston, and the means for supplying carbureted air to the cylinder on the suction stroke, of means for supplying air to the cylinder on alternate outward strokes of the piston, and an inspirator in the cylinder wall so controlled by the piston as to permit liquid fuel to pass into the cylinder in addition to the carbureted charge.

4. In an internal combustion engine, the combination with the cylinder and the piston, and the means for supplying carbureted air to the cylinder on the suction stroke, of means to supply air to the cylinder on alternate outward strokes of the piston, and means operative on the suction stroke of the piston to supply the cylinder with additional air, said air being mixed with an additional charge of fuel in liquid form.

5. In an internal combustion engine, the combination with the cylinder and the piston, and the means for supplying carbureted air to the cylinder on the suction stroke, of means for supplying air to the cylinder near the end of the suction stroke, means to introduce an additional charge of fuel into the cylinder to mix with such air, and means for varying the amount of fuel so introduced.

6. In an internal combustion engine, the combination with the cylinder and piston, and the means for supplying carbureted air to the cylinder on the suction stroke, of means to supply air under pressure to the cylinder near the end of the suction stroke, and means to introduce into the cylinder near the end of the suction stroke an additional body of air mixed with fuel in liquid form.

7. In an internal combustion engine, the combination with the cylinder and piston, and the means for supplying the cylinder with carbureted air on the suction stroke, of means to admit air to the cylinder near the end of the suction stroke, said means including a compressor in which the air is compressed, and an inspirator in the cylinder wall supplied with liquid fuel, such fuel being introduced into the cylinder near the end of the suction stroke by means of air from the compressor assisted by the partial vacuum in the cylinder.

8. In an internal combustion engine, the combination of a cylinder and piston, means to admit carbureted air to the cylinder on the suction stroke, a compressor in which air is compressed, an inspirator in the cylinder wall, means to supply liquid fuel to said inspirator, and a connection between said inspirator and the compressor which forces such liquid fuel into the cylinder near the end of the suction stroke.

9. An internal combustion engine provided with a cylinder, having means to supply the cylinder with carbureted air on the suction stroke, means to supply surplus air to the cylinder on the suction stroke, and means operative on the suction stroke to supply the cylinder with liquid fuel.

10. The method of operating an internal combustion engine which consists in drawing carbureted air into the cylinder from the beginning of the suction stroke of the piston, introducing liquid fuel into the cylinder later on in the suction stroke, such liquid fuel being sprayed through the cylinder wall under pressure, then, as the piston nears the end of the suction stroke, admitting a relatively large quantity of combustion-supporting air to the cylinder, cutting off such air at the beginning of the compression stroke, then cutting off the liquid fuel, and firing the mixture in the cylinder when the compression stroke is substantially complete.

11. In an internal combustion engine, the combination of a cylinder having a firing chamber associated with the head portion thereof, a piston in said cylinder, an air compressor, a by-pass leading from the air compressor to the lower portion of the cylinder and controlled solely by the position of the piston, an exhaust port in the cylinder wall substantially opposite the inlet port of said by-pass, and an inspirator in the cylinder wall above the inlet port of said by-pass, said inspirator being in communication with the compressor and being also controlled by the piston, whereby the air under pressure is admitted to the cylinder from he inspirator during part of each suction stroke of the piston.

12. In an internal combustion engine, the combination of a cylinder having a firing chamber associated with the head portion thereof, a piston in said cylinder, an air compressor, a by-pass leading from the air compressor to the lower portion of the cylinder and controlled solely by the position of the piston, an exhaust port in the cylinder wall substantially opposite the inlet port of said by-pass, an inspirator in the cylinder wall above the inlet port of said by-pass, said inspirator being in communication with the compressor and being also controlled by the piston, whereby the air under pressure is admitted to the cylinder from the inspirator during part of each suction stroke of the piston, and means to supply fuel to the inspirator during the suction stroke so that such fuel is fed into the cylinder by means of air under pressure.

In testimony whereof I affix my signature, in presence of two witnesses.

HERMON E. DUNHAM.

Witnesses:
CHAS. J. O'NEILL,
VERNON T. HOUGHTON.